(12) United States Patent
Matsubayashi et al.

(10) Patent No.: US 7,689,545 B2
(45) Date of Patent: Mar. 30, 2010

(54) SYSTEM AND METHOD TO ENABLE PARALLEL TEXT SEARCH USING IN-CHARGE INDEX RANGES

(75) Inventors: Tadataka Matsubayashi, Machida (JP); Michio Iijima, Yokohama (JP); Yuichi Ogawa, Yokohama (JP); Masaki Yotsutani, Kawasaki (JP); Shinya Yamamoto, Koube (JP)

(73) Assignee: Hitachi, Ltd., Tokyo (JP)

( * ) Notice: Subject to any disclaimer, the term of this patent is extended or adjusted under 35 U.S.C. 154(b) by 352 days.

(21) Appl. No.: 11/185,733

(22) Filed: Jul. 21, 2005

(65) Prior Publication Data
US 2006/0101004 A1    May 11, 2006

(30) Foreign Application Priority Data
Nov. 9, 2004   (JP)   .............................. 2004-324475

(51) Int. Cl.
G06F 7/00    (2006.01)

(52) U.S. Cl. .......................................... 707/3; 707/10
(58) Field of Classification Search ...................... 707/3
See application file for complete search history.

(56) References Cited

U.S. PATENT DOCUMENTS

| 7,254,580 | B1 * | 8/2007 | Gharachorloo et al. ...... 707/100 |
| 2003/0059030 | A1 * | 3/2003 | Tenorio ....................... 379/300 |
| 2004/0083289 | A1 * | 4/2004 | Karger et al. ............... 709/226 |
| 2004/0205044 | A1 * | 10/2004 | Su et al. ......................... 707/2 |
| 2005/0120004 | A1 * | 6/2005 | Stata et al. ..................... 707/3 |
| 2006/0080285 | A1 * | 4/2006 | Chowdhuri ..................... 707/3 |
| 2007/0208697 | A1 * | 9/2007 | Subramaniam et al. ........ 707/3 |

FOREIGN PATENT DOCUMENTS

| JP | 06-259478 | 9/1994 |
| JP | 8-194718  | 7/1996 |
| JP | 9-293006  | 11/1997 |

(Continued)

OTHER PUBLICATIONS

Luiz Andre Barroso, Jeffrey Dean, Urs Holzle, "Web Search for a planet: The Google Cluster Architecture", IEEE Micro, Mar./Apr. 2003, p. 22-28.*

(Continued)

*Primary Examiner*—Neveen Abel Jalil
*Assistant Examiner*—Vei-Chung Liang
(74) *Attorney, Agent, or Firm*—Brundidge & Stanger, P.C.

(57) ABSTRACT

In registering operation of a document to be searched for, a document identifier management table for managing a range of a document identifier stored for each page and a page identifier of the page is created, and an individual-search-server's search range management table for managing the range of the document identifier in charge of each search server is created. In searching operation of each search server of the document to be searched for, the individual-search-server's search range management table is referred to acquire a range of the allocated document identifier. For each index key forming a query term specified as a query condition, the document identifier management table is referred to to acquire the page identifier storing the document identifier of the allocated range. The searching operation is carried out by referring to a page shown by the acquired page identifier.

13 Claims, 10 Drawing Sheets

FOREIGN PATENT DOCUMENTS

JP    2001-142752    5/2001

OTHER PUBLICATIONS

L. Chu, H. Tang, T. Yang, and K. Shen. Optimizing data aggregation for cluster-based Internet services. In Proc. of the ACM SIGPLAN Symposium on Principles and Practice of Parallel Programming, San Diego, California, Jun. 2003.*

Berthier A. Ribeiro-Neto, Edleno Silva de Moura, Marden S. Neubert, Nivio Ziviani, Efficient Distributed Algorithms to Build Inverted Files, SIGIR '99: Proceedings of the 22nd Annual International ACM SIGIR Conference on Research and Development in Information Retrieval, Aug. 15-19, 1999, Berkeley, CA, USA.*

Forbes J. Burkowski, Retrieval performance of a distributed text database utilizing a parallel processor document server, International Symposium on Databases for Parallel and Distributed Systems archive, Proceedings of the second international symposium on Databases in parallel and distributed systems, Dublin, Ireland pp. 71-79, 1990.*

Berthier A. Ribeiro-Neto and Ramurti A. Barbosa, Query performance for tightly coupled distributed digital libraries, International Conference on Digital Libraries archive Proceedings of the third ACM conference on Digital libraries, Pittsburgh, Pennsylvania, United States pp. 182-190, 1998.*

MacFarlane, A., McCann,J.A., Robertson, S.E., Parallel search using partitioned inverted files, Seventh International Symposium on String Processing and Information Retrieval, Sep. 2000, A Curuna, Spain, pp. 209-220.*

S. Brin,L. Page: The Anatomy of a Large-Scale Hypertextual Web Search Engine. WWW7 / Computer Networks 30(1-7): 107-117 (1998).*

Claudine Badue and Ricardo Baeza-Yates, "Distributed Query Processing Using Partitioned Inverted Files", Proceedings of 8th International Symposium on String Processing and Information retrieval SPIRE 2001, Nov. 13-15, 2001, p. 10-20.*

Japanese Office Action for Japanese Patent Application No. 2004-342275, Feb. 27, 2009.

Daijiro Mori et al., "A Study on Distributed Full-Tex Retrieval System", NTT Human Interface Laboratories, Nov. 27, 1998.

Satoshi Hayami et al., "Proposal and Evaluation of Scalable WWW Parallel Search Engine Designing Methods", Jan. 23, 2001.

* cited by examiner

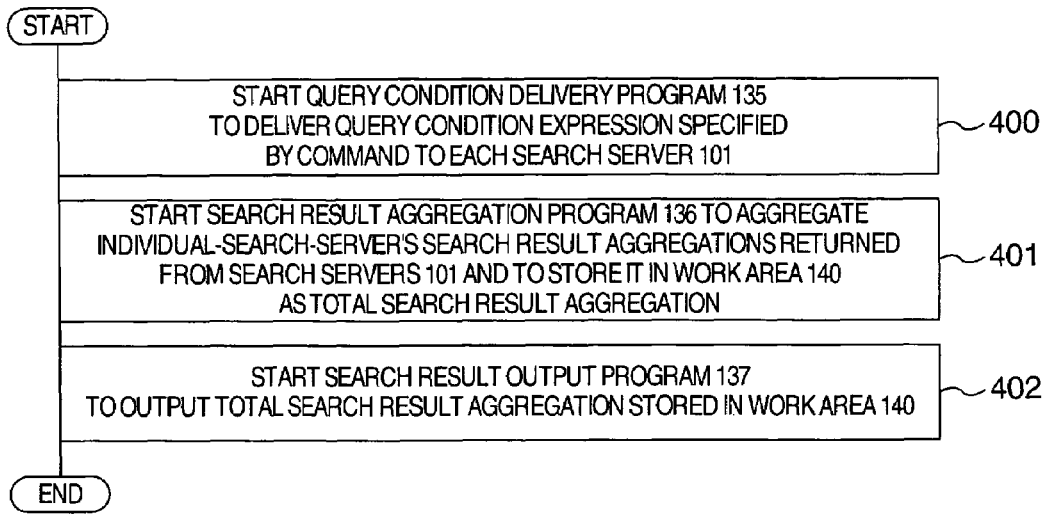
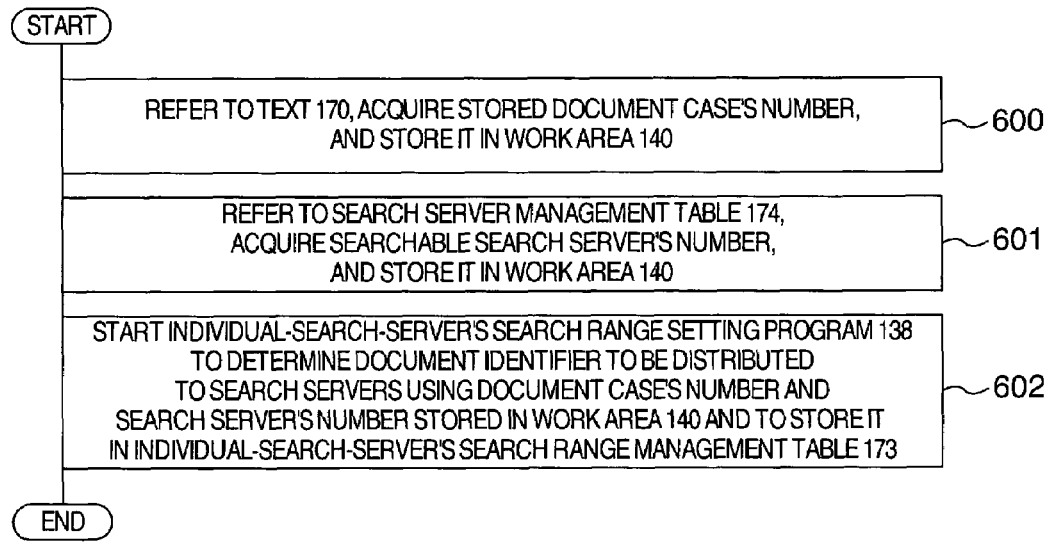

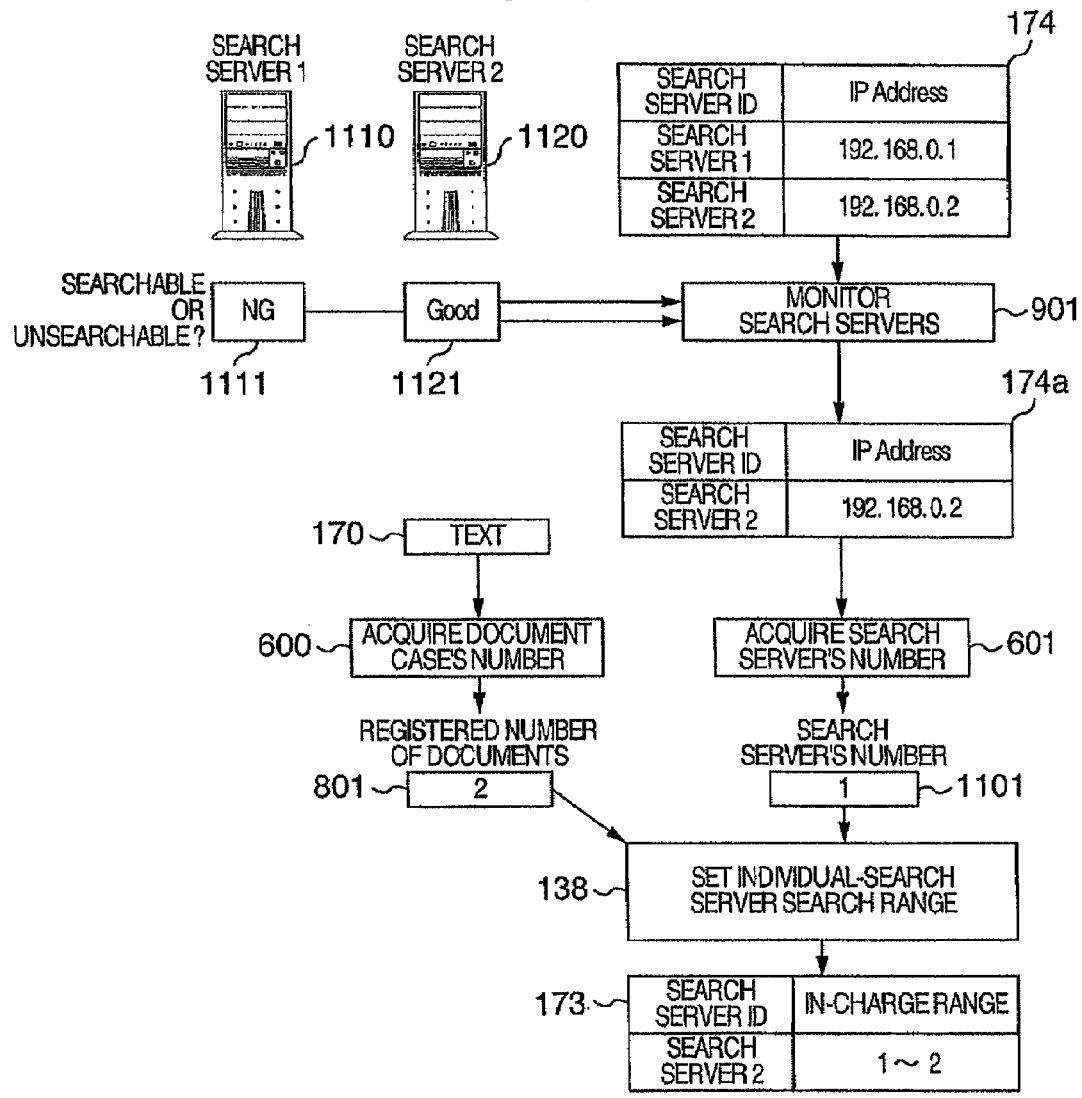

SYSTEM AND METHOD TO ENABLE PARALLEL TEXT SEARCH USING IN-CHARGE INDEX RANGES

INCORPORATION BY REFERENCE

The present application claims priority from Japanese application JP2004-324475 filed on Nov. 9, 2004, the content of which is hereby incorporated by reference into this application.

BACKGROUND OF THE INVENTION

The present invention relates to a method and system for retrieving stored document data parallelly with use of a plurality of computers and more particular, to a method for changing the number of computers which share retrieval processing.

As personal computers and the Internet spread these years, electronic documents have been explosively increased and a tendency of such document increase will be expected to further continue. Under such circumstances, a users' demand for wanting to search for documents including desired information at high speed is increasing.

As a technique for serving such a growing need, much attention is focused on a full text search technique for searching for documents including a character string (which will be referred to as a query term, hereinafter) specified as a query condition.

As one of such full text search techniques, there is disclosed in JP-A-8-194718 a method for deciding a document that matches the query condition, for example, by previously generating a character string index which has the appearance position of a character string having a length of n characters (which is called n-gram) appearing in the document to be searched together with a document identifier applied to the document, and by comparing an appearance order of the n-gram of the query term specified as a query condition appearing in the document with an appearance order obtained by referring to the corresponding character string index for the document to be searched.

In JP-A-8-194718, since retrieval processing can be carried out only by referring to a character string index generated for the n-gram of a query term, desired documents can be searched for at high speed, regardless of the number of documents to be searched for.

When the above JP-A-8-194718 is employed, a document including desired information can be searched for at high speed.

As a method for adding a search server with an increased quantity of data, there is disclosed in JP-A-9-293006 a database management method for allocating newly-added data to an added search server while not moving existing data.

Also disclosed in JP-A-2001-142752 is a database management method for realizing high-speed data rearrangement by previously dividing data into buckets as predetermined logical units and then managing the buckets.

Even when such a document search system according to JP-A-8-194718 is introduced, however, the capacity of a character string index generated with an increased number of search target documents is also increased. As a result, the search speed is gradually decreased.

To avoid this, a method for reducing the number of documents per one search server to be searched for by using a plurality of search servers in a document search system, is employed.

When a search server is added according to such a database management method as shown in JP-A-9-293006, data stored in an existing search server is not moved. Thus, a retrieval processing time by the existing search server is not improved. This results in that the retrieval processing time of the entire system cannot be improved and the object of the search server addition cannot be attained. In other words, in order to suitably use the method of JP-A-9-293006, it is required to add a search server under such situations that a sufficient retrieval processing time can be obtained, and it is difficult to decide the timing of search server addition when the method is actually carried out.

When the database management method of JP-A-2001-142752 is employed, data is allocated equally to all search servers. Thus, the retrieval processing time of the entire system can be improved. Since the data is managed based on predetermined unit buckets, however, it is similarly necessary to also manage a character string index by bucket unit. To this end, during execution of retrieval processing, a first search result is generated by referring to a character string index for each bucket, and such first search results are merged for all the buckets to generate a second search result for each search server. And when such second search results are merged for all the search servers, a final search result can be obtained. In other words, it is necessary to perform the merging operation of the search results according to the number of buckets and this disadvantageously leads to a large retrieval processing cost.

SUMMARY OF THE INVENTION

It is an object of the present invention to provide a document retrieval method by which retrieval processing times of search servers can be made substantially equal even when a search server is added according to increased data quantity and a search result can be obtained with a necessary minimum cost.

In accordance with the present invention, the above object is attained by providing a document retrieval method for searching a document database for one of documents stored in the document database which matches a specified query condition with using one or more than one server. The method comprises steps of generating an index for a character string included in the document wherein the index comprises one or more than one management unit having a predetermined size, creating an index management table to manage the range of the document stored in each of the management unit, determining an in-charge range as a document range to be searched for by each search server, identifying the index management unit to search for the determined in-charge range by referring to the index management table, and executing the search by referring to the index corresponding to the identified management unit.

Other objects, features and advantages of the invention will become apparent from the following description of the embodiments of the invention taken in conjunction with the accompanying drawings.

BRIEF DESCRIPTION OF THE DRAWINGS

FIG. 4 is a PAD for explaining a processing procedure of a retrieval control program 122 in the system management server 100 in the first embodiment of the invention;

FIG. 6 is a PAD for explaining a processing procedure of a search server management/control program 123 in the system management server 100 in the first embodiment of the invention;

FIG. 11 is a diagram for explaining a processing procedure of the search server management/control program 123a in the system management server 100 in the second embodiment of the invention;

FIG. 12 shows a specific example of a search server management table 174b in the second embodiment of the invention;

DETAILED DESCRIPTION OF THE EMBODIMENT

Figure 1:
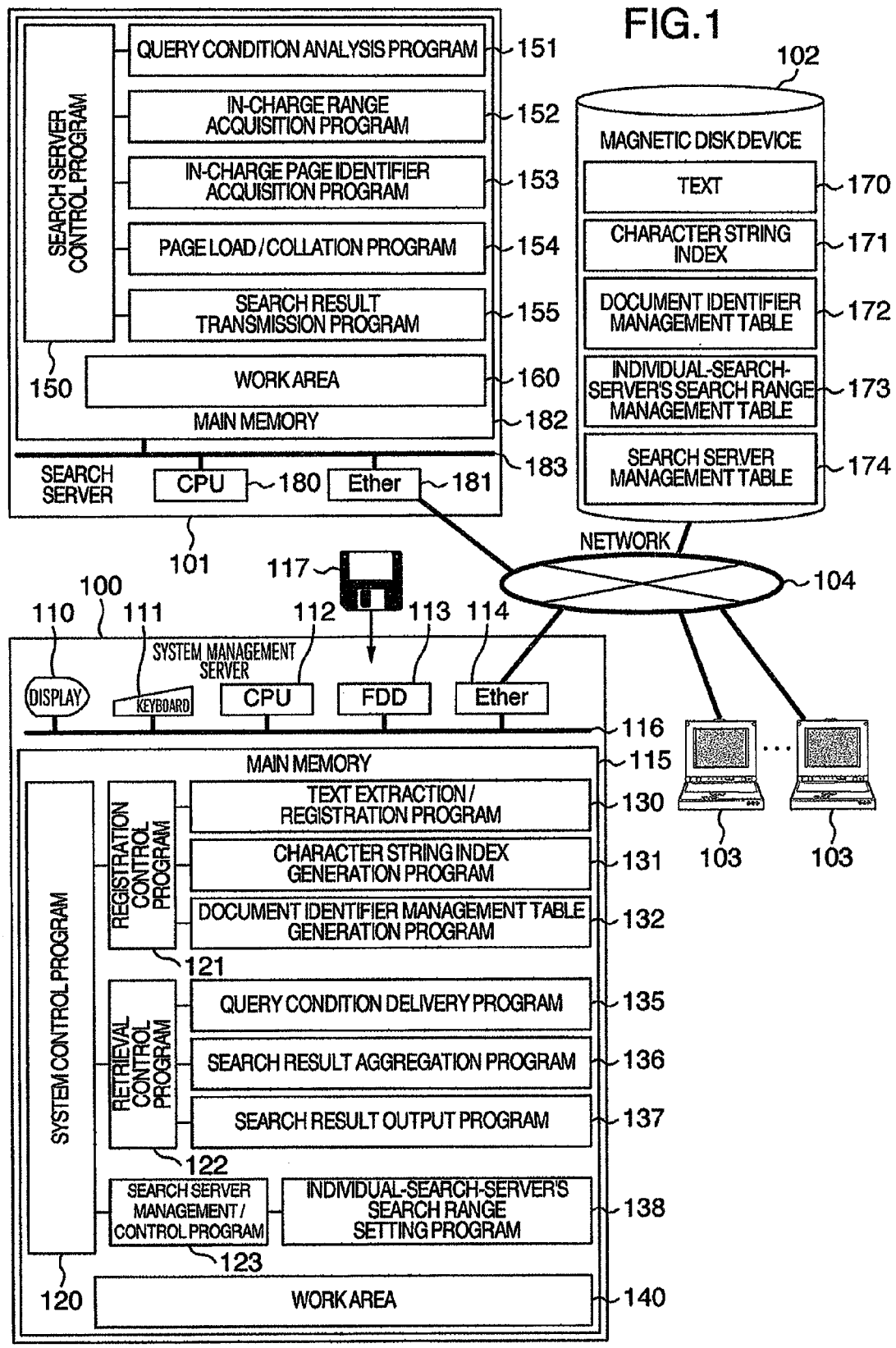
FIG. 1 shows a general arrangement of a document retrieval system in accordance with a first embodiment of the present invention.

A first embodiment of the present invention will be explained with reference to FIG. 1.

The first embodiment of a document retrieval system to which the present invention is applied includes a system management server 100, a search server 101, a magnetic disk device 102, a query client 103, and a network 104 for interconnecting these components.

Explanation will be made as to a system configuration of the system management server 100.

The system management server 100 has a display 110, a keyboard 111, a central processing unit (CPU) 112, a floppy disk drive (FDD) 113, a network board (Ether) 114, a main memory 115, and a bus 116 for connecting these components. Information stored in a floppy disk 117 via the FDD 113 is loaded in the main memory 115 and then stored in the magnetic disk device 102 via the network 104.

Stored in the main memory 115 of the system management server 100 are a system control program 120, a registration control program 121, a retrieval control program 122, a search server management/control program 123, a text extraction/registration program 130, a character string index generation program 131, a document identifier management table creation program 132, a query condition delivery program 135, a search result aggregation program 136, a search result output program 137, an individual-search-server's search range setting program 138. Further, a work area 140 is reserved in the main memory.

The system control program 120 includes the registration control program 121, the retrieval control program 122, and the search server management/control program 123.

The registration control program 121 includes the text extraction/registration program 130, the character string index generation program 131, and the document identifier management table creation program 132.

The retrieval control program 122 includes the query condition delivery program 135, the search result aggregation program 136, and the search result output program 137.

The search server management/control program 123 includes the individual-search-server's search range setting program 138.

The registration control program 121, the retrieval control program 122, and the search server management/control program 123 are started under control of the system control program 120 in response to an user's instruction from the keyboard 111 or from the query client 103 connected to the network 104; and control the text extraction/registration program 130, the character string index generation program 131, and the document identifier management table creation program 132, control the query condition delivery program 135, the search result aggregation program 136, and the search result output program 137, and control the individual-search-server's search range setting program 138, respectively. The system configuration of the system management server 100 has been explained above.

Explanation will next be made as to a system configuration of the search server 101.

The search server 101 includes a central processing unit (CPU) 180, a network board (Ether) 181, a main memory 182, and a bus 183 connected to these components.

Stored in the main memory 182 of the search server 101 are a search server control program 150, a query condition analysis program 151, an in-charge range acquisition program 152, an in-charge page identifier acquisition program 153, a page load/collation program 154, and a search result transmission program 155. Further, a work area 160 is reserved in the main memory.

The search server control program 150 includes the query condition analysis program 151, the in-charge range acquisition program 152, the in-charge page identifier acquisition program 153, the page load/collation program 154, and the search result transmission program 155.

The search server control program 150 is started with a search execution command delivered from the system management server via the network 104; and controls the query condition analysis program 151, the in-charge range acquisition program 152, the in-charge page identifier acquisition program 153, the page load/collation program 154, and the search result transmission program 155.

The system configuration of the search server 101 has been explained above.

The magnetic disk device 102 is one of secondary storages, and stores therein a text 170, a character string index 171, a document identifier management table 172, an individual-search-server's search range management table 173, and a search server management table 174. The system configuration of the document retrieval system to which the present invention is applied, has been explained above.

The present embodiment has been explained in connection with the example wherein the registration control program 121, the retrieval control program 122, and the search server management/control program 123 are started with a command entered from the keyboard 111 of the system management server 100 or input from the query client 103 connected to the network 104. However, the above program may be started with an event or a command input via another input device.

Further, the above programs may be stored in the magnetic disk device 102, the floppy disk 117, or a storage medium (not shown in FIG. 1) such as MO, CD-ROM or DVD to be loaded in the main memory 115 of the system management server 100 or in the main memory 182 of the search server 101 via the drive device and to be executed under control of the CPU 112 of the system management server 100 or the CPU 180 of the search server.

Alternatively, these programs may be loaded in the main memory 115 of the system management server 100 or in the main memory 182 of the search server 101 via the network 104 to be executed under control of the CPU 112 of the system management server 100 or the CPU 180 of the search server.

In addition, it is described that the text 170, the character string index 171, the document identifier management table 172, the individual-search-server's search range management table 173, and the search server management table 174 are stored in the magnetic disk device 102 in the present embodiment. However, these test, index and tables may stored in the main memory 115 of the system management server 100 or in the main memory 182 of the search server 101; or may be stored in the floppy disk 117 or in a storage medium (not shown in FIG. 1) such as MO, CD-ROM or DVD to be loaded in the main memory 115 of the system management server 100 or in the main memory 182 of the search server 101 via the drive device for use.

Although the above explanation has been made in connection with the example wherein the work area 140 of the system management server 100 and the work area 160 of the search server 101 are reserved on the main memory 115 of the system management server 100 and on the main memory 182 of the search server 101; the work areas may be reserved in the magnetic disk device 102, in the floppy disk 117, or in a writable storage medium (not shown in FIG. 1) such as MO, CD-R or DVD.

Though the system management server 100, the search server 101, and the query client 103 have been configured using physically different servers in the present embodiment; the servers and client may be included in a single server.

Although the above explanation has been made in connection with the example wherein the system management server 100, the search server 101, the magnetic disk device 102, and the query client 103 are connected to the same network 104; these may be connected to physically different networks.

A processing procedure of the document retrieval system according to the present embodiment will be next explained.

Figure 2:
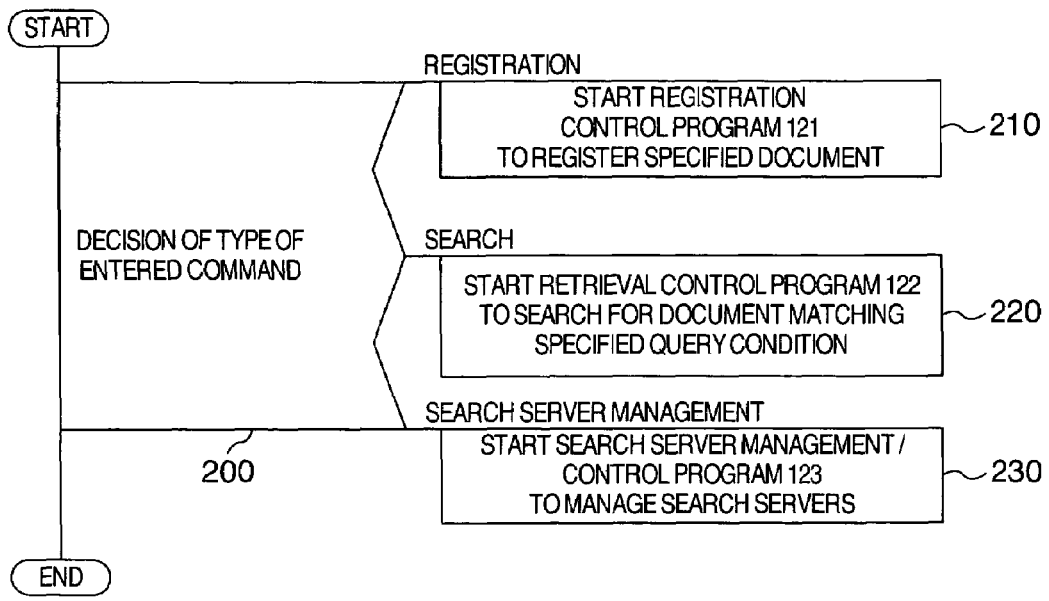
FIG. 2 is a problem analysis diagram (PAD) for explaining a processing procedure of a system control program 120 in a system management server 100 in the first embodiment of the invention.

A processing procedure of the system control program 120 in the system management server 100 will be first explained by referring to a problem analysis diagram (PAD) of FIG. 2.

The system control program 120 analyzes the type of a command entered from the keyboard 111 (step 200).

When the command is a registration execution command as the analyzed result, this causes the registration control program 121 to be started to execute the registering operation of a document specified by the registration execution command (step 210).

When the command is determined to be a search execution command in the step 200, this causes the retrieval control program 122 to be started and to execute retrieval processing of a document matching a query condition specified by the search execution command (step 220).

When the command is determined to be a search server management/execution command in the step 200, this starts the search server management/control program 123 to manage the search server (step 230).

The processing procedure of the system control program 120 in the system management server 100 has been explained above. Explanation will then be made as to a processing procedure of the registration control program 121 started by the system control program 120 in the step 210 of FIG. 2, by referring to a PAD of FIG. 3.

The registration control program 121 first reads a document specified by a command and stores it in the work area 140 (step 300).

Next, the registration control program 121 starts the text extraction/registration program 130 to extract a text from the document stored in the work area 140 in the step 300, store it in the work area 140, and also store it in the magnetic disk device 102 as the text 170 (step 301).

Next, the program 121 starts the character string index generation program 131 to generate a character string index for the text stored in the work area 140 in the step 301 and to store it in the magnetic disk device 102 as the character string index 171 (step 302).

Subsequently, the registration control program 121 starts the document identifier management table creation program 132 to acquire an identifier for the stored document for each page of the character string index 171 generated in the step 302 and to store it together with the page identifier in the document identifier management table 172 of the magnetic disk device 102 (step 303). The processing procedure of the registration control program 121 has been explained above.

Explanation will next be made as to a processing procedure of the retrieval control program 122 started by the system control program 120 in the step 220 of FIG. 2, by referring to a PAD of FIG. 4.

The retrieval control program 122 first starts the query condition delivery program 135 to deliver an query condition expression specified by a command to each search server 101 (step 400).

The search server 101 shown in FIG. 1 is illustrated by only one. In the step, however, the query condition expression is delivered even to any of a plurality of the search servers 101.

The retrieval control program 122 next starts the search result aggregation program 136 to aggregate an aggregation of results searched by search servers 101 and delivered from the search servers (which is referred to as individual-search-server's search result aggregation) and to store it in the work area 140 as a total search result aggregation (step 401).

And the retrieval control program 122 starts the search result output program 137 to output the total search result aggregation stored in the work area 140 in the step 401 (step 402).

The processing procedure of the retrieval control program 122 has been explained above.

Figure 5:
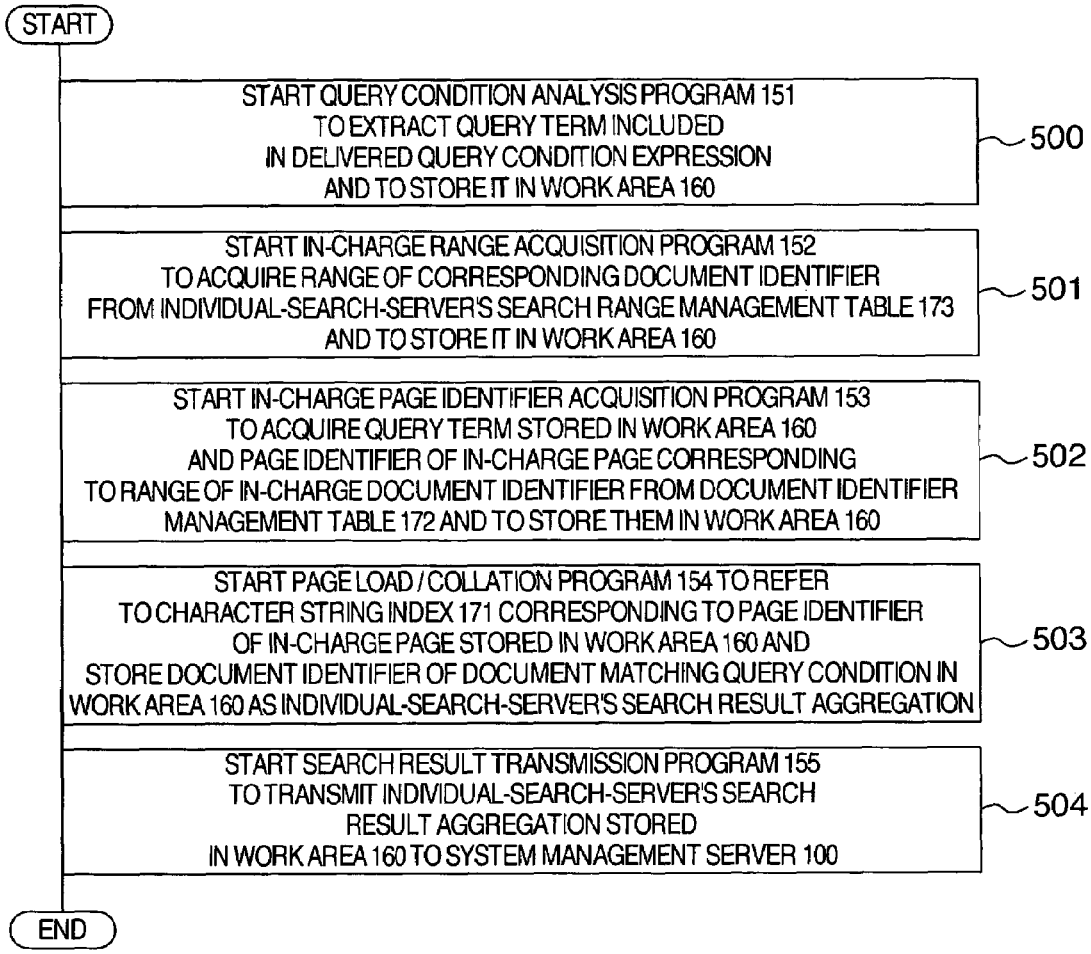
FIG. 5 is a PAD for explaining a processing procedure of a search server control program 150 in a search server 101 in the first embodiment of the invention.

Explanation will then be made as to a processing procedure of the search server control program 150 started by each search server 101 when receiving the query condition expression delivered in the step 400 of FIG. 4, by referring to a PAD of FIG. 5.

The search server control program 150 first starts the query condition analysis program 151 to extract a query term included in the query condition expression delivered from the system management server 100 in the step 400 of FIG. 4 and store it in the work area 160 (step 500).

The search server control program 150 next starts the in-charge range acquisition program 152 to acquire the range of an in-charge document identifier (which is referred to as the in-charge document range, hereinafter) from the individual-search-server's search range management table 173 and to store it in the work area 160 (step 501).

Next, the search server control program 150 starts the in-charge page identifier acquisition program 153 to acquire the query term stored in the work area 160 by the query condition analysis program 151 in the step 500 as well as a page identifier of a page (which is referred to as the in-change page) corresponding to the in-charge document range stored in the work area 160 by the in-charge range acquisition program 152 in the step 501 from the document identifier management table 172 and to store them in the work area 160 (step 502).

The search server control program 150 then starts the page load/collation program 154 to acquire a document identifier for a document matching the query condition by referring to the character string index 171 corresponding to the page identifier of the in-charge page stored in the work area 160 by the in-charge page identifier acquisition program 153 in the step 502 and to store it in the work area 160 as an individual-search-server's search result aggregation (step 503).

Next, the search server control program 150 starts the search result transmission program 155 to transmit the individual-search-server's search result aggregation stored in the work area 160 in the step 503 to the system management server (step 504).

The processing procedure of the search server control program 150 started in each search server 101 has been explained above.

Explanation will be then made as to a processing procedure of the search server management/control program 123 started by the system control program 120 in the step 230 of FIG. 2, by referring to FIG. 6.

The search server management/control program 123 first refers to the text 170, acquires the number of stored document cases, and stores it in the work area 140 (step 600).

The search server management/control program 123 then refers to the search server management table 174, acquires the number of searchable search servers, and stores it in the work area 140 (step 601).

The search server management/control program 123 next starts the individual-search-server's search range setting program 138 to determine a document identifier to be delivered to each search server with use of the number of documents stored in the work area 140 in the step 600 and the number of search servers stored in the work area in the step 601 and to stores it in the individual-search-server's search range management table 173 (step 602).

The processing procedure of the search server management/control program 123 has been explained above.

A specific processing procedure of the document retrieval system in accordance with the first embodiment of the present invention will be explained with reference to FIGS. 7 and 8.

First, document registering operation (FIG. 3) in the document retrieval system of the first embodiment of the present invention will be explained in detail by referring to FIG. 7.

Figure 7:
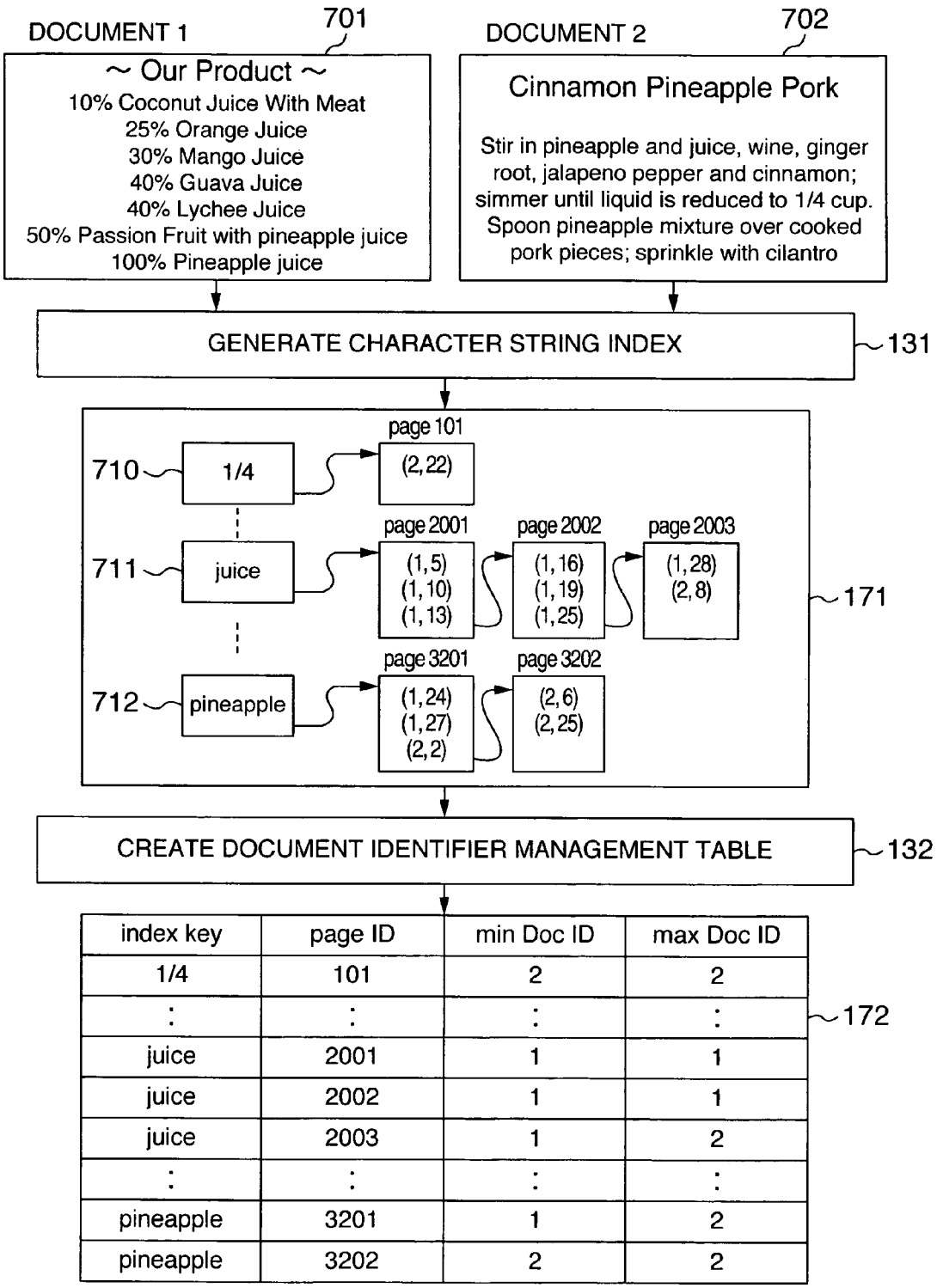
FIG. 7 is a diagram for explaining registration procedure in the first embodiment of the invention.

FIG. 7 shows a processing flow when such document 1 and document 2, which have contents which follow, are registered.

Document 1:

~Our Product~

10% Coconut Juice With Meat

25% Orange Juice

30% Mango Juice

40% Guava Juice

40% Lychee Juice

55% Passion Fruit with pineapple

100% Pineapple Juice

Document 2:

Cinnamon Pineapple Pork

Stir in pineapple and juice, wine, ginger Root, jalapeno pepper and cinnamon;

Simmer until liquid is reduced to ¼ cup.

Spoon pineapple mixture over cooked Pork pieces; sprinkle with cilantro

Figure 3:
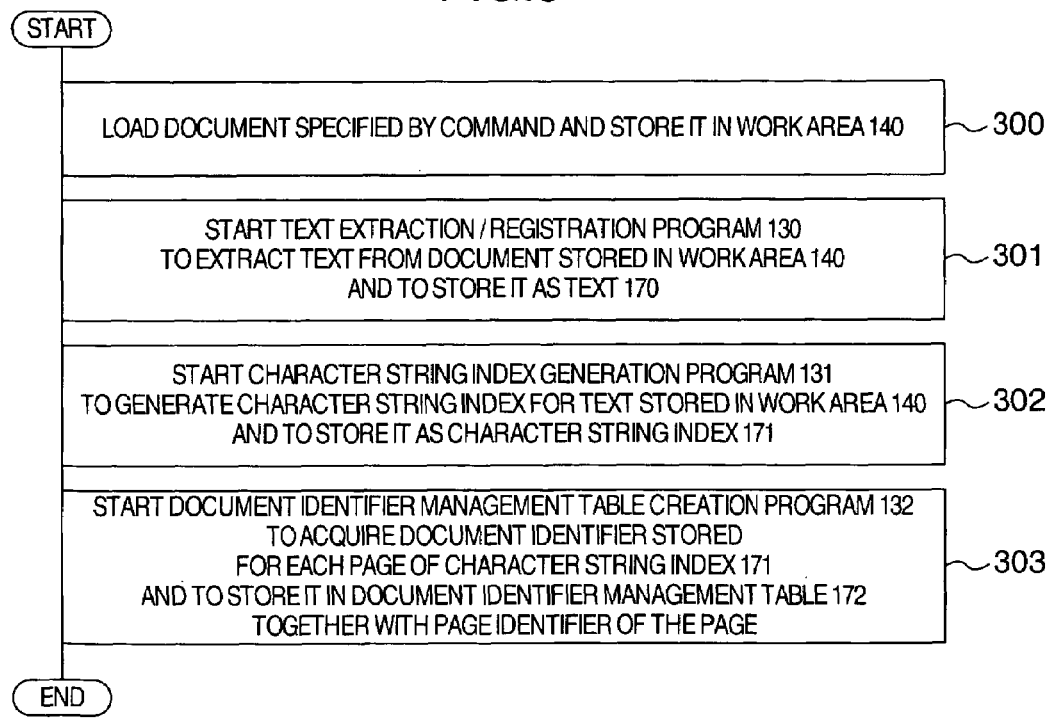
FIG. 3 is a PAD for explaining a processing procedure of a registration control program 121 in the system management server 100 in the first embodiment of the invention.

In the illustrated example, the steps 300 and 301 in FIG. 3 are executed for the documents 1 and 2, and a text 701 and a text 702 are extracted therefrom.

Next, the step 302 in FIG. 3 is executed so that the character string index 171 for the texts 701 and 702 is generated by the character string index generation program 131.

In the illustrated example, with respect to words "¼", "juice" and "pineapple" extracted with use of space or the like as a delimiter, character string indexes 710, 711 and 712 are generated, respectively.

In the illustrated example, information (2, 22) (referred to as index information) indicative of the appearance count of the document for the word "¼" and of an appearance position in the document is stored as the character string index 710. The index information is stored in a page having a page identifier "101". The index information (2, 22) indicates that the word appears in the document 2 as the 22nd word.

Similarly, index information (1, 5), (1, 10), (1, 13), (1, 16), (1, 19), (1, 25), (1, 28) and (2, 8) about the word "juice" indicate that these information are stored separately in pages having page identifiers 2001, 2002 and 2003 respectively, and that the pages are connected by pointers. Index information (1, 24), (1, 27), (2, 2), (2, 6) and (2, 25) about the word "pineapple" indicate that these information are stored separately in pages having page identifiers 3201 and 3202 respectively, and that the pages are connected by a pointer. Next, the step 303 in FIG. 3 is executed so that the index information about each word is stored in the document identifier management table 172 by the document identifier management table creation program 132.

In the illustrated example, the index information for each is managed together with minimum and maximum document identifiers for each page. "Index key", "page ID", "min Doc ID", and "max Doc ID" in the document identifier management table 172 indicate a character string of the stored word, a page identifier for the stored word, minimum and maximum document identifiers stored in the page, respectively.

For example, with respect to entries relating to the word "¼", the index information on the word "¼" is stored in the page having the page identifier 101, and the minimum and maximum document identifiers stored in the page are respectively 2.

The specific flow of the document registering operation in the document retrieval system of the present embodiment has been explained above.

Next, detailed explanation will be made as to flows of document searching operation (FIGS. 4 and 5) and search server managing operation (FIG. 6) in the document retrieval system of the first embodiment of the invention, by referring to FIG. 8.

Figure 8:
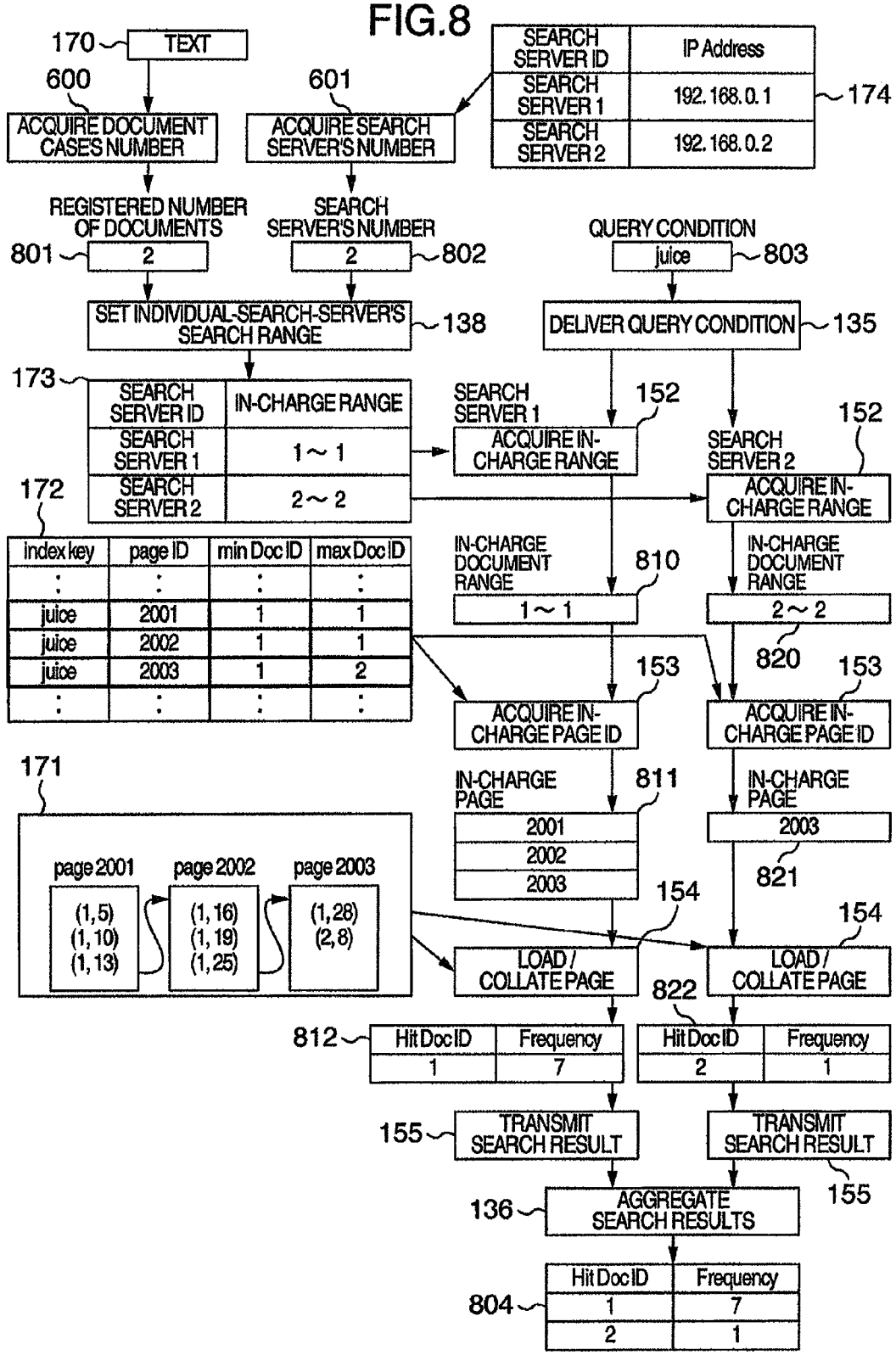
FIG. 8 is a diagram for explaining a search server management procedure and a retrieval processing procedure in the first embodiment of the invention.

FIG. 8 shows an example when a word "juice" is specified as a query condition with regard to a document database having the documents 1 and 2 registered therein. In this drawing, the searching operation for the query condition is executed to be shared by two search servers as an example.

First, the step 600 in FIG. 6 is executed as the search server managing operation to acquire the number of documents (which are referred to as the registered documents, hereinafter) stored in the text 170.

In the illustrated example, the registered number of documents is acquired to be "2", and two documents are stored in the text 170.

The step 601 of FIG. 6 is then executed to acquire the number of search servers stored in the search server management table 174.

In the illustrated example, two search servers, that is, a search server (referred to as the search server 1, hereinafter) having an identifier 1 and a search server (referred to as the search server 2, hereinafter) having an identifier 2 are stored in the search server management table 174, and the number of search servers is acquired to be "2".

The step 602 of FIG. 6 is next executed so that document identifier range in each search server's charge is determined by the individual-search-server's search range setting program 138 and stored in the individual-search-server's search range management table 173.

In the illustrated example, since "2" is set as a registered number of documents 801 and "2" is set as the number of search servers 802, one document is set to each search server as in-charge document range. That is, the document 1 is allocated to the search server 1 and the document 2 is allocated to the search server 2. An expression "m-n" in the entry of "in-charge document range" indicates documents having document identifiers not smaller than m and not larger than n are allocated.

The flows of the search server managing operation have been explained above.

The step 400 of FIG. 4 is executed as document retrieval processing in the system management server 100 to cause the query condition delivery program 135 to deliver the query condition to each search server 101. In the illustrated example, an entered query condition 803 "juice" is delivered to the search servers 1 and 2 respectively.

Next, the step 501 in FIG. 5 is executed in each search server 101 to cause the in-charge range acquisition program 152 to acquire the in-charge document range in each search server 101 from the individual-search-server's search range management table 173. In the illustrate example, "1-1" is acquired as the in-charge document range 810 of the search server 1. Similarly, "2-2" is acquired as the in-charge document range 820 of the search server 2.

The step 502 of FIG. 5 is then executed so that the in-charge page identifier acquisition program 153 refers to the document identifier management table 174 to acquire an page identifier of a page to be referred to in order to execute the retrieval processing of the in-charge document range in each search server 101. In the illustrated example, with regard to the word "juice" specified as a query condition 803; page identifiers 2001, 2002 and 2003 are acquired as in-charge pages 811 necessary for executing retrieval processing over the in-charge document range "1-1" of the search server 1. A page identifier 2003 is acquired as an in-charge page 821 necessary for executing retrieval processing over the in-charge document range "2-2" of the search server 2.

Next, the step 503 of FIG. 5 is executed in such a manner that the page load/collation program 154 refers to pages in the character string index 171 corresponding to the in-charge page 811 or 812, in each search server 101 and executes retrieval processing of the corresponding search server according to the specified query condition 803. The illustrated example shows that an individual-search-server's search result aggregation 812 is obtained which indicates "7 times" appearance in the document having the document identifier 1 in the search server 1, whereas an individual-search-server's search result aggregation 822 is obtained which indicates "1 time" appearance in the document having the document identifier 2 in the search server 2.

Then the step 504 of FIG. 5 is executed so that the search result transmission program 155 causes the individual-search-server's search result aggregation obtained in each search server 101 to be transmitted to the system management server 100.

And the step 401 of FIG. 4 is executed so that the search result transmission program 155 causes the individual-search-server's search result aggregations obtained in search servers 101 to be aggregated into a total search result aggregation of the entire retrieval system as an aggregation of all search results. In the illustrated example, the individual-search-server's search result aggregations 812 and 822 transmitted from the search servers 1 and 2 are aggregated into a total search result aggregation 804.

The specific processing procedure of the document searching operation in the document retrieval system of the present embodiment has been explained above.

In the retrieval processing procedure of the present embodiment, explanation has been made in connection with the example wherein, upon executing the retrieval processing, the step 501 of FIG. 5 is executed so that the in-charge range acquisition program 152 acquires the in-charge document range of each search server. However, it is not always required for the step 501 to be executed through the flow, but it may be executed after completion of document registering operation or after the number of search servers is set before executing the retrieval processing.

The first embodiment of the present invention has been explained above.

As has been explained above, in accordance with the first embodiment of the present invention, when the range of a document identifier stored in each page is managed and the search range for each search server is previously managed, each search server can acquire all the document identifiers for the allocated range at high speed. As a result, the retrieval processing times of the search servers can be made substantially equal. Since no such merging operation as to acquire individual-search-server's search result aggregations obtained in the respective search servers takes place, the search result can be obtained with a necessary minimum cost.

Although explanation has been made in the connection with the document retrieval system having the documents written in English as an example in the present embodiment, any language other than English can be employed. In other words, in the document registering operation of the first embodiment of the invention, the word has been extracted with use of space or the like as a delimiter. For a language such as Japanese not having a clear delimiter, however, a word extracted by referring to a word dictionary may be used or a character string having a length N (referred to as N-gram) may be extracted.

Though explanation has been made in connection with the word index system used as the character string index 171 in the present embodiment, the present invention is not limited to the index system but an N-gram index system as an example may be employed.

In the present embodiment, explanation has been made in connection with the full text search system used as an example. However, the present invention can be obviously applied to such a similar document retrieval system for searching for a document similar to a specified sentence.

Though explanation has been made in connection with the example wherein three pieces of index information are stored in the single page in FIG. 7 in the present embodiment, the present invention is not limited to the three index information, as a matter of course. Further, a different number of pieces of index information may be stored for each word.

A second embodiment of the present invention will next be explained with reference to FIG. 9.

The second embodiment of a document retrieval system according to the invention is intended to flexibly realize addition or deletion of a search server. More specifically, the system configuration is flexibly modified, by realizing short-time-processing as when a search server is added with a case when an increase in the registered number of documents causes an increase in the number of documents to be searched for by one search server with an insufficient search performance of each search server, or as when part of search servers is deleted due to a trouble or temporary server lending to another business.

Figure 9:
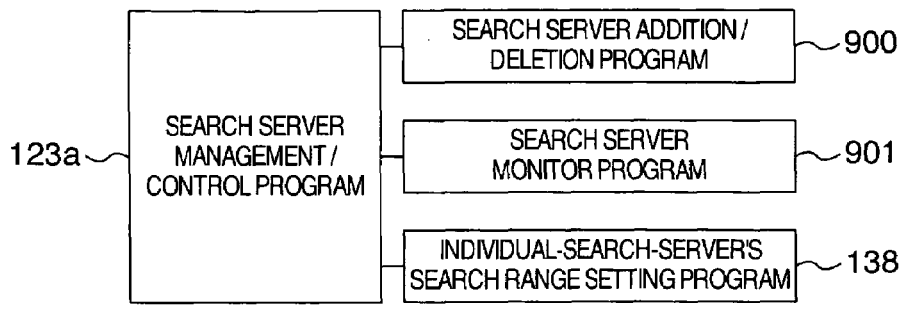
FIG. 9 shows a structure of a search server management/control program 123a in a system management server in a second embodiment of the invention.

The present embodiment has substantially the same arrangement as the first embodiment (FIG. 1), but is different therefrom in that, as shown in FIG. 9, a search server management/control program 123a corresponding to the search server management/control program 123 in the main memory 115 of the system management server 100 in FIG. 1 stores, in addition to the individual-search-server's search range setting program 138, a search server addition/deletion program 900 and a search server monitor program 901. Other arrangement is the same as that of FIG. 1.

Of the processing procedure in the present embodiment, the processing procedure of the search server management/control program 123a different from that in the first embodiment will be explained by referring to a PAD of FIG. 10. In the illustrated processing procedure, only steps 1000 to 1022 are different from those of FIG. 6 in the first embodiment. And the other steps are substantially the same as those in FIG. 6.

The search server management/control program 123a first analyzes the type of a command entered from the keyboard 111 (step 1000).

When the program determines that the command is search server's number change command as the analyzed result, the program starts the search server addition/deletion program 900 to add or delete a search server specified by the command (step 1010).

When the command is determined to be a search server state monitor command in the step 1000, the search server management/control program 123a repetitively executes the steps 1021 to 1022 on each search server stored in the search server management table 174 (step 1020).

The search server management/control program 123a first starts the search server monitor program 901 to monitor the state of the search server selected in the step 1020 via the network 104 (step 1021).

Next, the program deletes information relating to a search server which cannot continue the retrieval processing from the search server management table 174 (step 1022).

The processing procedure of the search server management/control program 123a has been explained above.

A managing procedure of a search server in the document retrieval system according to the second embodiment of the present invention will be detailed by referring to FIG. 11.

FIG. 11 is an example of search server deleting procedure when the search server 1 is put in such a state that the server cannot execute the retrieval processing due to a trouble or the like (which state will be referred to as a unsearchable state, hereinafter) in a retrieval system wherein retrieval processing is executed to be shared by two search servers 1 and 2.

The search server monitor program 901 started in the step 1021 of FIG. 9 first detects information 1121 indicative of the state "good" of the search server 2 capable of continuing the retrieval processing and information 1111 indicative of the state "NG" of the search server 1 incapable of executing the retrieval processing.

Figure 10:
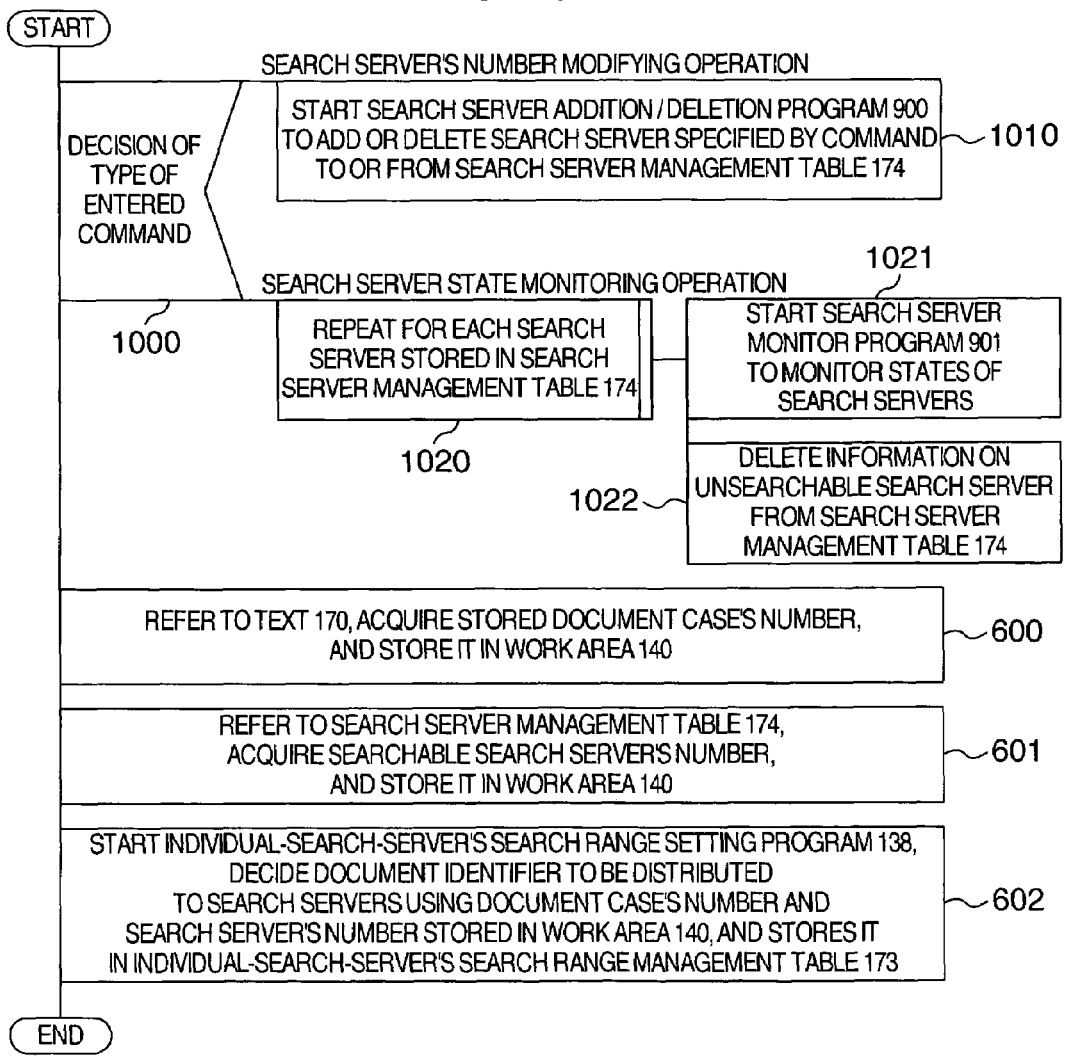
FIG. 10 is a PAD for explaining a processing procedure of the search server management/control program 123a in the system management server 100 in the second embodiment of the invention.

Next, the step 1022 in FIG. 10 is executed to delete information about the search server 1 stored in the search server management table 174. In the illustrated example, information on the search server 1, "search server ID=search server 1" and "IP address=192.168.0.1", are deleted. A search server management table 174a reflecting the deletion result stores only information "search server ID=search server 2" and "IP address=192.168.0.2".

As a result, the step 601 in FIG. 10 is executed to acquire the number of search servers capable of continuing the retrieval processing. In the illustrated example, since the search server capable of continuing the retrieval processing is only the search server 2, "1" is acquired as a search server's number 1101.

Then the step 602 in FIG. 10 is executed so that the individual-search-server's search range setting program 138 causes an in-charge document range to be set for each search server capable of continuing the retrieval processing and be stored in the individual-search-server's search range management table 173. In the illustrated example, "1-2" as the in-charge document range is allocated to the search server 2 capable of continuing the retrieval processing.

The specific flow of the managing operation of the search servers in the present embodiment has been explained above.

Although explanation has been made in connection with the deleting operation of the search server as an example in FIG. 10, even the adding operation of the search server can be similarly realized, as a matter of course. In the present embodiment, further, the monitoring of each search server has been carried out under control of the search server monitor program 901 via the network 104. However, each search server may be connected to an exclusive network line for trouble detection. Or when a response time from each search server times out, the search server may be determined to be unsearchable. Or a process provided in the search server 101 and allocated thereto may be monitored.

In the present embodiment, the state of the search server has been evaluated by two values of "Good" and "NG". However, the in-charge document range may be increased according to the retrieval processing performance, the in-charge document range may be determined according to a CPU resource ratio (referred to as the load ratio, hereinafter) allocated for retrieval processing execution as in search server management table 174b shown in FIG. 12, or these demands may be combined for use.

In the search server management table 174b shown in FIG. 12, in addition to "search server ID" and "IP address", "retrieval processing performance" indicative of the processing performance of the search server and "load ratio" indicative of a CPU resource ratio allocated for retrieval processing execution are stored. However, another index may be used and stored. For example, "usable memory" for each search server, "communication rate" by the network board 181, "CPU performance" or the like is considered.

The second embodiment of the present invention has been explained above.

As has been explained above, since the addition or deletion of a search server can be realized only by updating the individual-search-server's search range management table 173 and the search server management table 174, the system configuration can be flexibly modified. As a result, the system configuration is flexibly modified, by realizing short-time processing of the addition of a search server due to an increase in the registered number of documents or the deletion of a search server due to a trouble or temporary server lending to another business.

Figure 13:
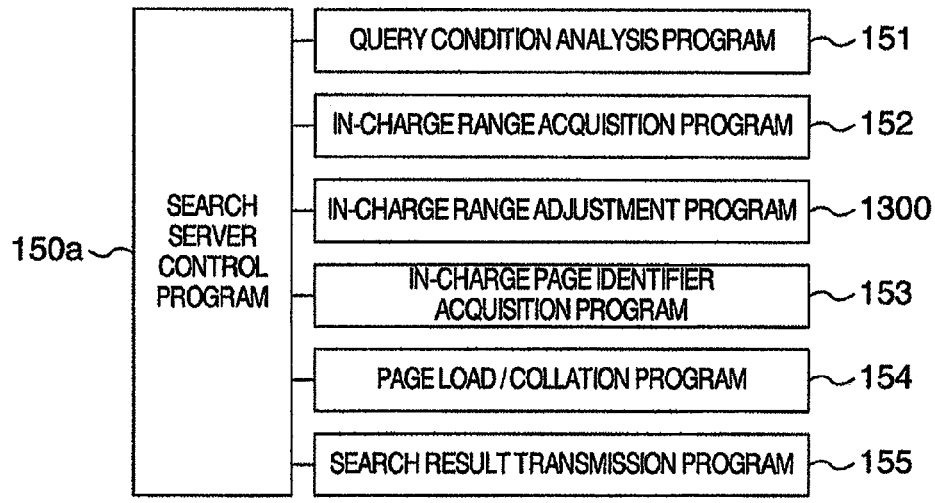
FIG. 13 shows a structure of a search server control program 150a in a search server 101 in a third embodiment of the invention.

Explanation will then be made as to a third embodiment of the present invention by referring to FIG. 13.

The third embodiment of the document retrieval system according to the present invention is intended to optimize the retrieval processing time of the entire retrieval system by setting an in-charge document range for each word stored in the character string index 171 to make the retrieval processing times of the search servers uniform.

When the above is simply carried out, different in-charge document ranges are set for different search servers according to a query term. For this reason, when logical operation search such as logical AND search or logical OR search is specified using a plurality of query terms, or when a query condition expression specifying a distance between words is specified; the retrieval processing cannot be completed within each search server and the retrieval processing must be executed after all search results are aggregated in the system management server 100 or the like.

As a result, since the processing is sequentially carried out when the search results are aggregated in spite of the fact that the retrieval processing is carried out parallelly with a plurality of search servers; the entire retrieval system requires an enormous search time.

The third embodiment of the document retrieval system according to the present invention is arranged so that each search server can complete retrieval processing and the retrieval processing times of the search servers can be made substantially equal.

The arrangement of the present embodiment is substantially the same as that of the first embodiment (FIG. 1), but is different therefrom in that, as shown in FIG. 13, a search server control program 150a corresponding to the search server control program 150 in the main memory 182 of the search server 101 in FIG. 1 also includes an in-charge range adjustment program 1300. Other arrangement is the same as in FIG. 1.

Of the processing procedure of the present embodiment, a processing procedure of the search server control program 150a different from the first embodiment will be explained by referring to a PAD of FIG. 14.

The illustrated processing procedure is different from the processing procedure of the search server control program 150 in the first embodiment of FIG. 5 in steps 1400 and 1401. That is, the step 501 of FIG. 5 is replaced with the step 1400 and the step 1401 is newly added.

The search server control program 150a first starts the query condition analysis program 151 to extract a query term included in a query condition expression delivered from the system management server 100 and to store it in the work area 160 (step 500).

Next, the search server control program 150a starts the in-charge range acquisition program 152 to acquire a document identifier range (referred to as the individual-query-term's in-charge document range, hereinafter) relating to an in-charge document for each query term from the individual-search-server's search range management table 173 and to store it in the work area 160 (step 1400).

The search server control program 150a then starts the in-charge range adjustment program 1300 to compare processing costs of the query terms and to store the individual-query-term's in-charge document range relating to one of the query terms having the highest processing cost in the work area 160 as the document identifier range in charge of the search servers (step 1401).

The search server control program 150a next starts the in-charge page identifier acquisition program 153 to acquire from the document identifier management table 172 the query term stored in the work area 160 by the query condition analysis program 151 in the step 500 as well as a page identifier of a page (referred to as the in-charge page, hereinafter) corresponding to the in-charge document range stored in the work area 160 by the in-charge range acquisition program 152 in the step 501 and to store them in the work area 160 (step 502).

The search server control program 150a then starts the page load/collation program 154 to acquire a document identifier of a document matching the query condition by referring to the character string index 171 corresponding to the page identifier of the in-charge page stored in the work area 160 by the in-charge page identifier acquisition program 153 in the step 502, and to store it in the work area 160 as a individual-search-server's search result aggregation (step 503).

The search server control program 150a next starts the search result transmission program 155 to transmit the individual-search-server's search result aggregation stored in the work area 160 in the step 503 to the system management server (step 504).

The processing procedure of the search server control program 150a has been explained above.

Figure 15:
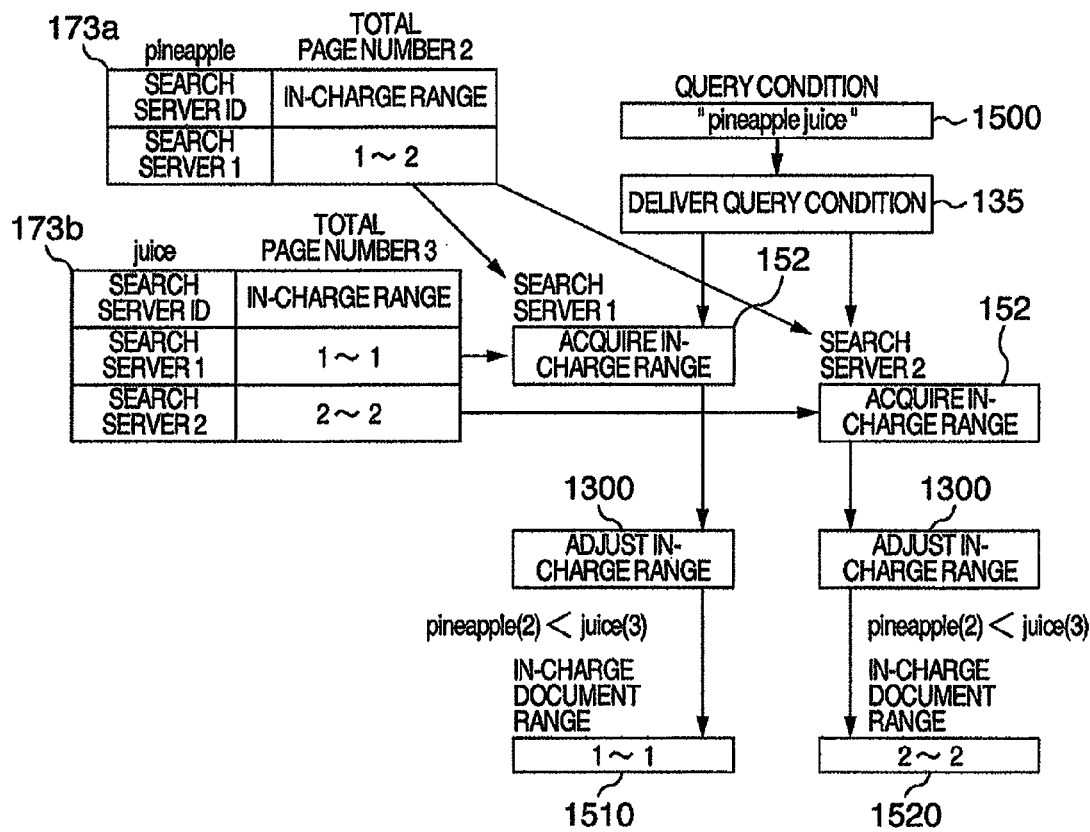
FIG. 15 is a diagram for explaining a retrieval processing procedure in the third embodiment of the invention.

Of the processing procedure of the search server control program 150a in the third embodiment of the invention shown in FIG. 14, steps 1400 and 1401 different from the first embodiment will be explained in detail with reference to FIG. 15.

Shown in the illustrated example is a processing procedure after "pineapple juice" is entered as a query condition 1500 until in-charge document ranges 1510 and 1520 in the search servers 1 and 2 are determined.

The system management server 100, when accepting the query condition 1500, first executes the step 400 of FIG. 4. And the query condition delivery program 135 delivers the query condition 1500 to each search server 101.

Figure 14:
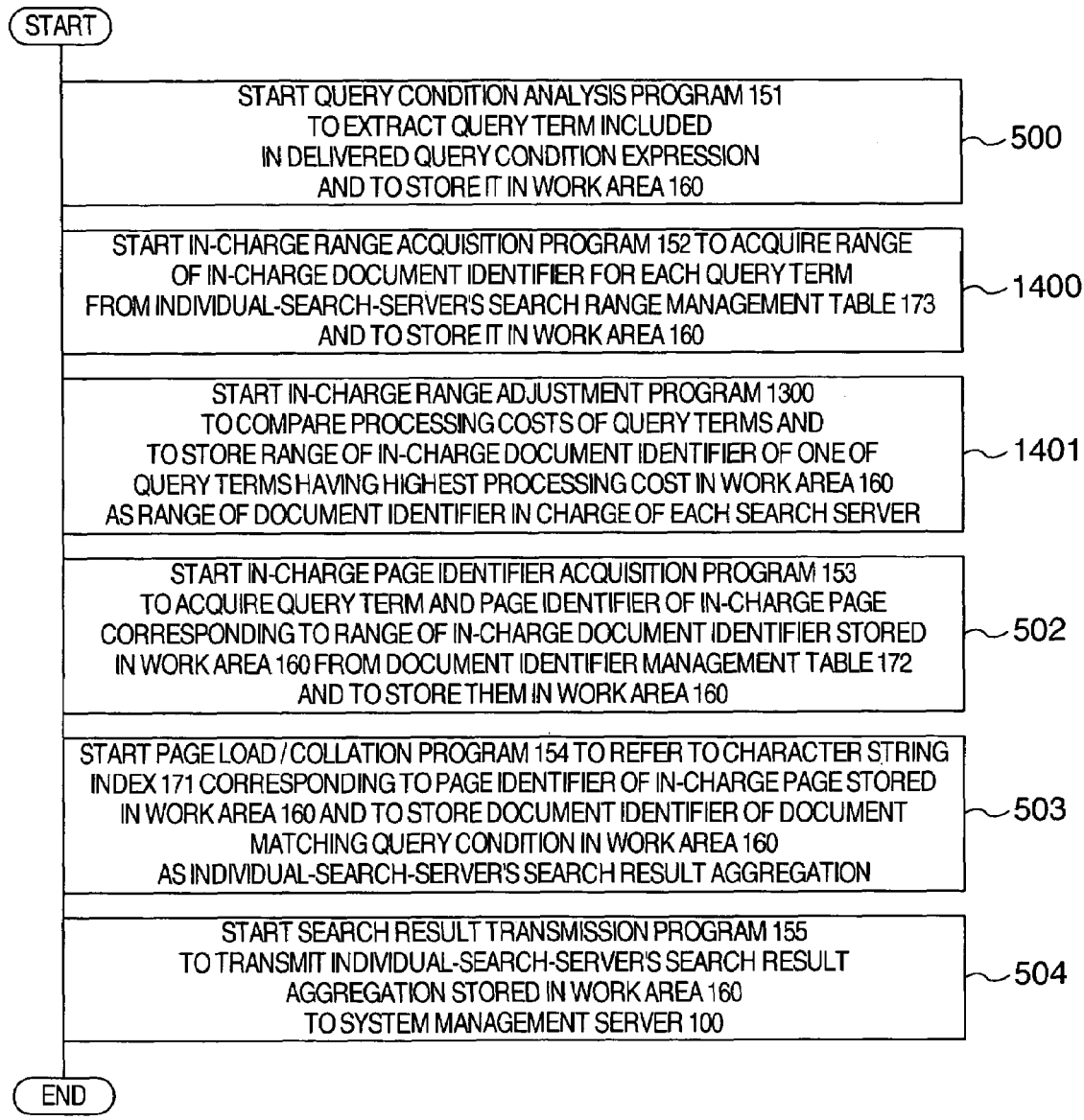
FIG. 14 is a PAD for explaining a processing procedure of a search server control program 150a in the search server 101 in the third embodiment of the invention.

Each search server 101, when accepting the query condition 1500, executes the step 500 in FIG. 14 and extracts a query term included in the query condition 1500. And the server executes the step 1400 in FIG. 14 and acquires an in-charge document range for each query term under control of the in-charge range acquisition program 152.

In the illustrated example, in-charge document ranges 173a and 173b relating to "pineapple" and "juice" included in the query condition 1500 of "pineapple juice" are acquired.

Next, the step 1401 in FIG. 14 is executed so that the in-charge range adjustment program 1300 acquires an individual-query-term's in-charge document range relating to one of the query terms having the highest processing cost as a final in-charge document range. In the illustrated example, since a total number of pages of character string indexes is treated as a processing cost, a total page number for the word "pineapple" is "2", and a total page number of the word "juice" is "3"; the individual-query-term's in-charge document range for the word "juice" is set as the final in-charge document range.

As a result, "1~1" is acquired as the in-charge document range 1510 in the search server 1, while "2~2" is acquired as the in-charge document range 1520 in the search server 2.

The specific processing procedure of the search server control program 150a has been explained above.

At this stage, the third embodiment of the present invention has been explained.

As has been explained in the foregoing, in accordance with the present embodiments, one of the individual-query-term's in-charge document ranges set for the words which corresponds to one of the query terms having the highest processing cost is selected. Therefore, the processing costs of the query terms can be equally shared by the search servers.

As a result, the retrieval processing can be completed in each search server and the retrieval processing times of the search servers can be made nearly equal. Although the total page number of the character string index 173 has been used as the processing cost of each word in the present embodiment, the retrieval processing times of the words may be previously measured and used.

As explained above, in the present invention, when the document identifier range stored in each management unit is managed and the search range for each search server is managed, each search server can acquire the document identifier in the allocated range at high speed.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A document retrieval method for searching a document database for documents matching a specified query condition using a system management server, a plurality of search servers and a storage device, comprising the following steps performed by:
   (1) the storage device, arranged to:
      (1)-1: store information for identifying each of the plurality of search servers;
      (1)-2: store a character string included in the documents with an association to:
         a document identifier of a document including the character string; and
         a page identifier of a page on which the character string is indexed; and
      (1)-3: store a document range with an association to the character string and the page identifier on which the character string is indexed;
   (2) the system management server, arranged to:
      (2)-1: receive the specified query condition from the storage device, and determine a range of documents to be searched by each of the search servers according to:
         the specified query condition, and
         the document identifier and the page identifier stored in the storage device,
      (2)-2: send information on:
         the range of documents determined to be searched to the storage device at which the range of documents to be searched is recorded, and
         the specified query condition to each of the search servers at which the specified query condition is recorded;
   (3) each of the plurality of search servers, arranged to:
      (3)-1: acquire a document identifier, and acquire a page identifier based on the document identifier, for each of the plurality of search servers, and
      (3)-2: perform a search operation of the document database at each of the search servers based on the specified query condition and the acquired page identifier; and
   (4) the system management server, further arranged to:
      (4)-1: output a total search operation result derived from the search operations performed for all of the plurality of search servers; wherein the system management server is further arranged to:
         compare processing costs for indexes when the indexes for two or more character strings are referred to execute the searching operation; and
         determine the range of documents set for the character string having the larger processing cost as the range of documents for all the character strings as a result of said comparison.

2. A document retrieval method according to claim 1, further comprising the following steps performed by:
   the system management server, arranged to:
      accept a request modify the number of search servers; and
      modify the range of documents on the basis of said modification request.

3. A document retrieval method according to claim 1, further comprising the following steps performed by:
   the system management server, arranged to:
      calculate a processing capability of each search server; and
      determine or modify each range of documents on the basis of said calculated processing capability.

4. A document retrieval method according to claim 3, further comprising the following steps performed by:
   the system management server, arranged to:
      measure a load of each search server; and
      calculate an available processing capability on the basis of said measured load of each search server.

5. A document retrieval method according to claim 3, further comprising the following steps performed by:
   the system management server, arranged to:
      calculate the available processing capability of the search server on the basis of a predetermined condition.

6. A document retrieval method according to claim 1, further comprising the following steps performed by:
   the system management server, arranged to:
      determine or modify each range of documents in units of a character string.

7. A document retrieval system for searching a document database for documents stored in the document database matching a specified query condition, comprising:
   (1) a storage device, arranged to:
      (1)-1: store information for identifying each of a plurality of search servers in the document retrieval system;
      (1)-2: store a character string included in the documents with an association to:
         a document identifier of a document including the character string; and
         a page identifier of a page on which the character string is indexed; and
      (1)-3: store a document range with an association to the character string and the page identifier on which the character string is indexed;
   (2) a system management server, arranged to:
      (2)-1: receive the specified query condition from the storage device, and determine a range of documents to be searched by each of the search servers according to:

the specified query condition, and
the document identifier and the page identifier stored in the storage device,
(2)-2: send information on:
the range of documents determined to be searched to the storage device at which the range of documents to be searched is recorded, and
the specified query condition to each of the search servers at which the specified query condition is recorded;
(3) wherein each of the plurality of search servers is arranged to:
(3)-1: acquire a document identifier, and acquire a page identifier based on the document identifier, for each of the plurality of search servers, and
(3)-2: perform a search operation of the document database at each of the search servers based on the specified query condition and the acquired page identifier; and
(4) wherein the system management server is further arranged to:
(4)-1: output a total search operation result derived from the search operations performed for all of the plurality of search servers; wherein the system management server is further arranged to:
compare processing costs for indexes when the indexes for two or more character strings are referred to execute the searching operation; and
determine the range of documents set for the character string having the larger processing cost as range of documents for all the character strings as a result of said comparison.

8. A document retrieval system according to claim 7, wherein the system management server is further arranged to:
accept a request relating to a modification of the number of search servers; and
modify the range of documents on the basis of said modification request.

9. A document retrieval system according to claim 7, wherein the system management server is further arranged to:
calculate a processing capability of each search server; and
determine or modify each range of documents on the basis of said calculated processing capability.

10. A document retrieval system according to claim 9, wherein the system management server is further arranged to:
measure a load of each search server; and
calculate an available processing capability on the basis of measured load of each search server.

11. A document retrieval system according to claim 9, wherein the system management server is further arranged to:
calculate a processing capability of the available search server on the basis of a predetermined condition.

12. A document retrieval system according to claim 7, wherein the system management server is further arranged to:
determine or modify each range of documents in units of a character string.

13. A computer-readable storage medium storing a document retrieval/execution program which, when executed by a computer, causes the computer to search a document database for documents stored in the document database matching a specified query condition using a system management server, a plurality of search servers, and a storage device, said program comprising:
acquire a document identifier of a document including a character string and a page identifier of a page on which the character string is indexed, based on the document identifier, for one of the plurality of search servers;
perform a search operation of the document database at the search server based on the specified query condition and the acquired page identifier;
compare processing costs for indexes when the indexes for two or more character strings are referred to execute the search operation;
determine a range of documents to be searched, set for the character string having the larger processing cost, as the range of documents to be searched for all character strings as a result of said comparison; and
send the result of the search operation to the system management server for aggregation with search results from each of the other search servers and output by the system management server.

\* \* \* \* \*